Jan. 31, 1961     D. S. HESTER     2,969,845
DRILL PIPE SAVING DEVICE
Filed Jan. 23, 1959
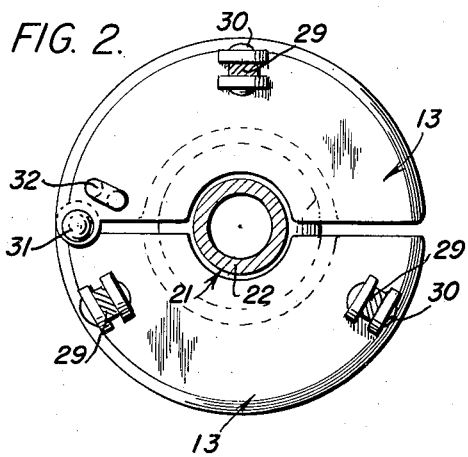
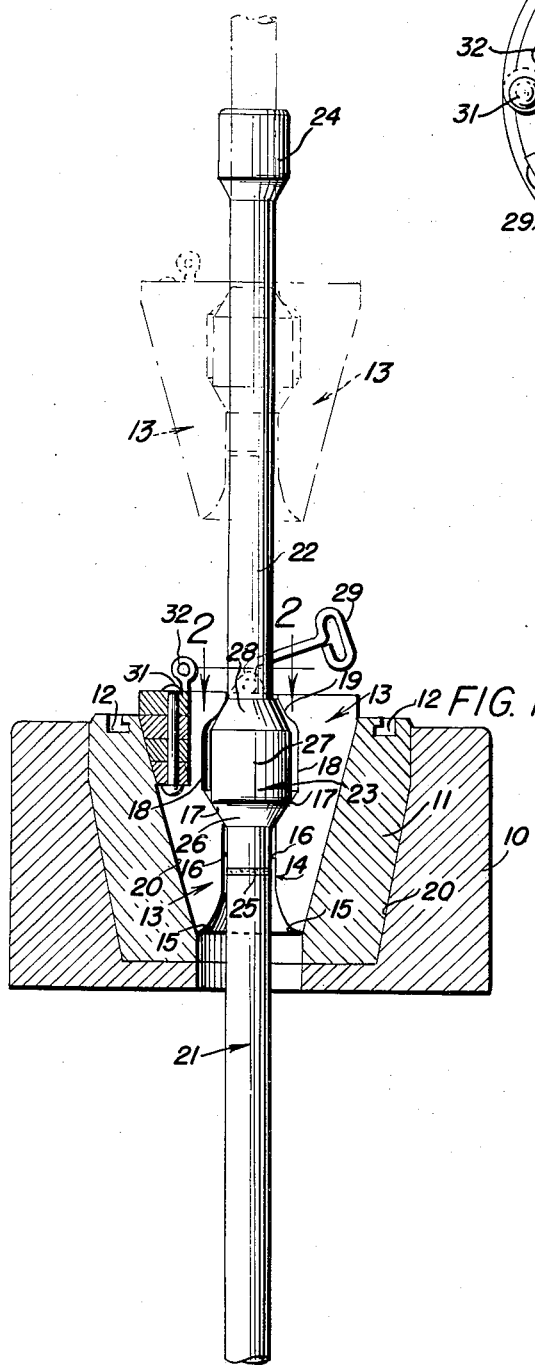
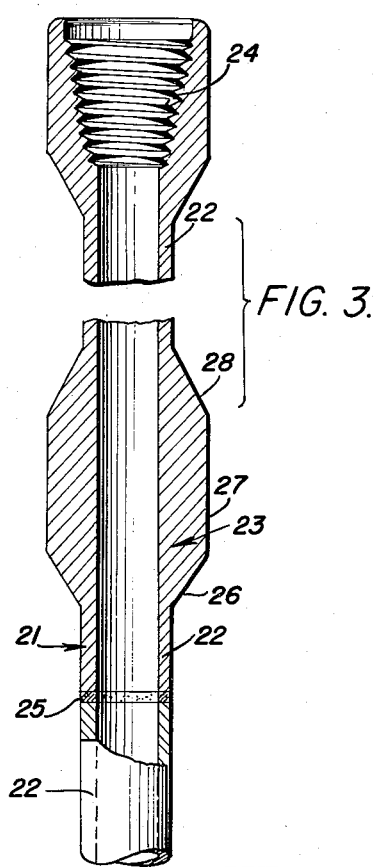
INVENTOR.
DEWEY S. HESTER
BY
*Victor J. Evans & Co.*
ATTORNEYS

United States Patent Office 2,969,845
Patented Jan. 31, 1961

2,969,845
DRILL PIPE SAVING DEVICE
Dewey S. Hester, 878 Belanger St., Houma, La.
Filed Jan. 23, 1959, Ser. No. 788,565
2 Claims. (Cl. 175—200)

This invention relates to drilling equipment, and more particularly to a pipe supporting or holding assembly.

The object of the invention is to provide a drilling assembly which includes a pipe member that is provided with an enlarged shoulder thereon, and wherein slips are provided for coaction with the shoulder so that the pipe member can be held in such a manner that damage to the pipe will be minimized or prevented.

Another object of the invention is to provide a pipe holding assembly wherein slips are provided with inner recessed portions or a chamber which is adapted to receive therein the enlarged shoulder on a pipe member so that the pipe will not be mashed or collapsed, and wherein wear on the parts will be minimized or prevented.

A further object of the invention is to provide a drill pipe saving device which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a sectional view illustrating the present invention;

Figure 2 is a sectional view taken on the line 2—2 of Figure 1; and

Figure 3 is an elevational view of the pipe member, with parts broken away and in section.

Referring in detail to the drawings, the numeral 10 indicates a drilling table which has a bushing 11 seated in a recess 20 in the table 10, and the bushing 11 is provided with an annular groove 12 in the upper end thereof whereby a suitable lifting tool can engage the groove 12 for use in lifting the bushing 11.

There is further provided a pair of slips 13 which are positioned in the bushing 11, and the pair of slips 13 coact to define a generally vertical chamber which is indicated generally by the numeral 14. The chamber 14 is shaped to include a lower flaring first portion 15, as well as a cylindrical second portion 16 which is above the first portion 15. The numeral 17 indicates a tapered third portion which is arranged above the second portion 16, and the third portion 17 terminates in a cylindrical fourth portion 18, and there is further provided a beveled fifth portion 19 which is arranged above the fourth portion 18.

The numeral 21 indicates a pipe member or pipe joint which includes a main body portion 22 of cylindrical formation, and the pipe member 21 is provided with an enlarged shoulder or lobe that is indicated generally by the numeral 23. A threaded portion 24 is arranged on the upper end of the pipe member 21 so that other pipe members can be joined thereto by means of this threaded connection, and as indicated by the numeral 25, various sections of pipe can be joined together as by welding.

The shoulder 23 includes a lower tapered first section 26, an intermediate cylindrical section 27, and an upper tapered third section 28.

Handles 29 are pivotally connected to the slips 13 as at 30, and the handles 29 are adapted to be gripped as for example when the slips 13 are to be lifted from the assembly. The pair of slips 13 are pivotally connected together as at 31 which is a hinge or pivot joint.

From the foregoing, it is apparent that there has been provided a drilling assembly wherein pipes such as the pipe 21 can be handled in a more expeditious and advantageous manner than has been heretofore possible. Table 10 is of conventional construction and has the bushing 11 seated therein, and the pair of opposed slips 13 are supported within the bushing 11. When the slips 13 are to be lifted out of the bushing 11, the handles 29 can be gripped so as to lift the slips from the bushing. Then, the hinge 31 permits the slips 13 to be swung open or closed as desired.

The slips 13 coact, when in their closed position to define the chamber 14, and the chamber 14 is shaped so as to include the lower curved portion 15, the cylindrical portion 16, the flaring or tapered portion 17, as well as the cylindrical portion 18, and the upper beveled portion 19. The construction or arrangement serves to insure that when a pipe member such as the pipe member 21 is in position in the apparatus, the shoulder 23 will be received in the chamber of the slips 13. Thus, the lower tapered section 26 of the shoulder 23 will engage the flaring portion 17, and the cylindrical section 27 of the shoulder will fit within the portion 18 of the chamber 14. The upper beveled portion 19 provides a construction or surface which eliminates or minimizes sharp corners or sharp edges, and the absence of such sharp corners or edges help prevent the adjacent elements from becoming snagged or inadvertently hung up on each other.

The portions of the pipe member may be joined together as at 25, and the numeral 25 may indicate a flash weld. It is to be noted that the diameter of the shoulder 23 at the portion 27 is greater than the diameter of the portion 16 so that the pipe member 21 cannot accidentally slip downwardly through the slips. This arrangement insures that the pipe member will not be accidentally crushed or damaged by the slips or other parts, and therefore, the pipe members will have a longer life and breakage or damage of the parts will be prevented.

The parts can be made of any suitable material and in different shapes or sizes.

The present invention is especially suitable for use when working deep wells and a very heavy weight can be supported. The pipe members may be pulled out of the well by means of an elevator of conventional construction. A suitable conventional drill bit is adapted to be arranged on the lower end of the lowermost pipe member. It is to be noted that the pipe will be held in such a manner that collapsing or mashing of the pipe will be prevented, whereas in other clamping assemblies, the pipe was often caved in by the slips or clamps. The particular formation of the chamber 14 in the slips 13 is advantageous since it snugly receives therein the shoulder portion 23 of the pipe 21. Furthermore, the shoulder 23 and the chamber 14 will function as a bearing so as to help eliminate wear on the parts.

As shown in the drawings, a securing element 32 may be provided, and the securing element 32 is adapted to have a suitable lifting mechanism or assembly attached thereto for use in lifting the parts.

Minor changes in shape, size and rearrangement of details coming within the field of invention claimed may be resorted to in actual practice, if desired.

I claim:

1. In a drilling assembly, a table provided with a recess, a bushing positioned in said recess and said table supporting said bushing, a pair of opposed slips positioned in said bushing and said slips being supported by said bushing, said slips coacting to define a hollow inner chamber, said chamber including a lower first portion which flares outwardly from top to bottom thereof, a cylindrical second portion above said first portion, a third portion above said second portion and said third portion tapering outwardly from bottom to top thereof, a cylindrical fourth portion above said third portion, a fifth portion above said fourth portion and said fifth portion tapering inwardly from bottom to top thereof, and a pipe member extending through said chamber, said pipe member having a shoulder positioned in said chamber, said shoulder being shaped to include sections of different cross-sectional areas which coact with corresponding portions of said chamber.

2. In a drilling assembly, a table provided with a recess, a bushing positioned in said recess and said table supporting said bushing, a pair of opposed slips positioned in said bushing and said slips being supported by said bushing, said slips coacting to define a hollow inner chamber, said chamber including a lower first portion which flares outwardly from top to bottom thereof, a cylindrical second portion above said first portion, a third portion above said second portion and said third portion tapering outwardly from bottom to top thereof, a cylindrical fourth portion above said third portion, a fifth portion above said fourth portion and said fifth portion tapering inwardly from bottom to top thereof, a pipe member extending through said chamber, said pipe member having an enlarged shoulder thereon, said shoulder including a lower first section which tapers outwardly from bottom to top thereof, an intermediate cylindrical second section above said first section, and an upper third section which tapers inwardly from bottom to top thereof, said shoulder being received in said chamber, and the sections of said shoulder coacting with the corresponding portions of said chamber.

References Cited in the file of this patent

UNITED STATES PATENTS

| | | |
|---|---|---|
| 1,983,545 | Johnson | Dec. 11, 1934 |
| 2,067,921 | Hild | Jan. 19, 1937 |
| 2,107,475 | Foster | Feb. 8, 1938 |
| 2,199,738 | Bowles | May 7, 1940 |
| 2,239,826 | Neuhaus | Apr. 29, 1941 |
| 2,259,431 | Spalding | Oct. 14, 1941 |
| 2,531,120 | Feaster | Nov. 21, 1950 |